United States Patent [19]

Saito et al.

[11] Patent Number: 5,222,168

[45] Date of Patent: Jun. 22, 1993

[54] METHOD FOR STACKING FERRULES OF A STACKED-TYPE OPTICAL CONNECTOR AND A STACKED-TYPE OPTICAL CONNECTOR

[75] Inventors: Masami Saito; Shinichiro Ohta; Hiroyuki Yamada; Etsuo Tanabe; Toshihiko Ohta, all of Tokyo, Japan

[73] Assignee: The Furukawa Electric Co., Ltd., Tokyo, Japan

[21] Appl. No.: 802,871

[22] Filed: Dec. 6, 1991

[30] Foreign Application Priority Data

Dec. 13, 1990 [JP] Japan .................. 2-401965
Dec. 14, 1990 [JP] Japan .................. 2-402298
Dec. 21, 1990 [JP] Japan .................. 2-404973
Mar. 7, 1991 [JP] Japan .................. 3-41975

[51] Int. Cl.⁵ .................................. G02B 6/38
[52] U.S. Cl. ............................ 385/59; 156/158
[58] Field of Search ..................... 385/56–60; 156/158

[56] References Cited

U.S. PATENT DOCUMENTS

| | | | |
|---|---|---|---|
| 3,871,935 | 3/1975 | Gloge et al. | 156/158 |
| 3,920,309 | 11/1975 | Garver | 339/198 R |
| 4,753,515 | 6/1988 | Sato et al. | 385/59 |
| 4,786,135 | 11/1988 | Boero | 385/59 |
| 4,789,218 | 12/1988 | Paul et al. | 385/59 X |
| 4,943,136 | 7/1990 | Popoff | 385/24 |

FOREIGN PATENT DOCUMENTS 0323920 7/1989 European Pat. Off.
2-297506 12/1991 Japan.

OTHER PUBLICATIONS

Patent Abstracts of Japan, vol. 15, No. 79 (P-1170) [4607] Feb., 1991.

Primary Examiner—Akm E. Ullah
Attorney, Agent, or Firm—Frishauf, Holtz, Goodman & Woodward

[57] ABSTRACT

A method for stacking ferrules of a stacked-type optical connector wherein stacking portions for stacking are provided in corresponding positions of each ferrule, the individual ferrules are stacked with the corresponding individual stacking portions aligned, and a plurality of ferrules are simultaneously stacked up with stacking members which work in cooperation with those corresponding stacking portions in such a manner that the ferrules can practically float with a specific degree of freedom to allow a gap between the ferrules, and a stacked-type optical connector assembled according to this method.

24 Claims, 15 Drawing Sheets

F I G. 1
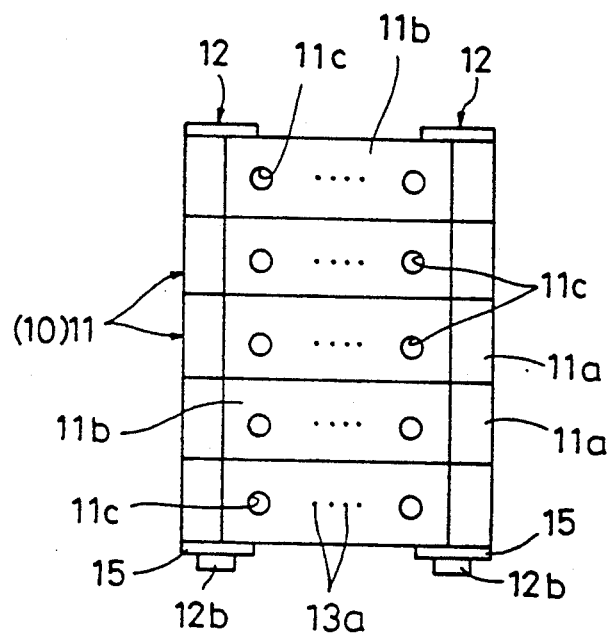
F I G. 2
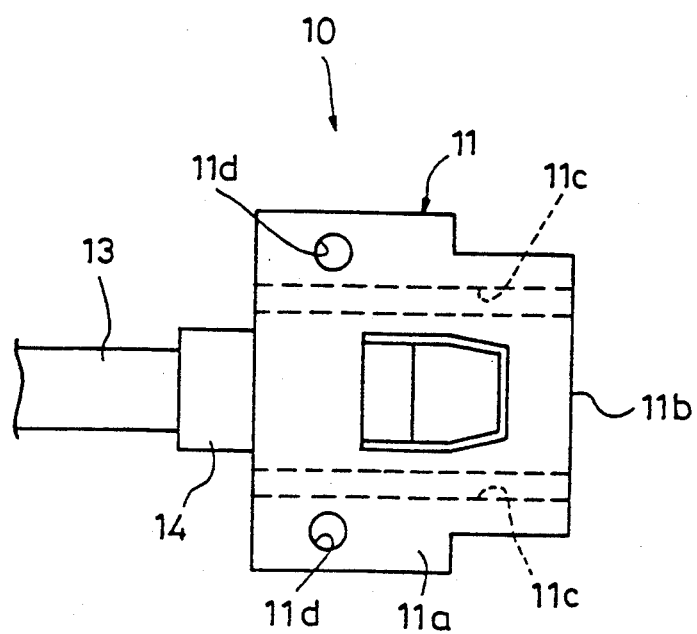

METHOD FOR STACKING FERRULES OF A STACKED-TYPE OPTICAL CONNECTOR AND A STACKED-TYPE OPTICAL CONNECTOR

BACKGROUND OF THE INVENTION

1. Field of the Invention

The present invention relates to a method for stacking ferrules of a stacked-type optical connector, and a stacked-type optical connector.

2. Description of Related Art

An optical connector used for butt-connecting individual optical fibers of optical communication lines has a ferrule 2 and a single or multi optical fiber 3 like, for example, an optical connector 1 as shown in FIG. 29, the multi optical fiber 3 being installed on a main body 2a with the individual optical fibers 3a exposed at a butting end surface 2b of the main body 2a. The ferrule 2 has pin holes 2c and 2c provided on either side with the multi optical fiber 3 of the main body 2a between them, and it is butt-connected to a ferrule of another optical connector having the same configuration by inserting connecting pins, which are not shown, in the individual pin holes 2c.

To butt-connect the optical connector 1 simultaneously with a plurality of other optical connectors, it is necessary to form a plurality of optical connectors 1 into one piece. A method described in, for example, Japanese Unexamined Patent Publication (Kokai) No. 2-297506, is known as a method for forming the optical connectors 1 into one piece.

However, when a plurality of optical connectors are assembled into one piece according to the aforementioned method, a stacking housing of a complicated shape with a plurality of inserting holes formed in it is required, and there are partitions taking an extra space between ferrules on the stacking housing. This presents a problem of a lower packaging density of an optical connector, hindering the achievement of a reduced size.

When consolidating optical connectors, conventionally, a plurality of optical connectors were rigidly fixed to a stacking housing or the like in some cases. However, there were some cases where the positions of the pin holes 2c and 2c in an optical connector were not aligned with those in its matching optical connector due to a manufacturing error or the like. This presented a problem of prohibiting smooth butt-connection because when a plurality of optical connectors were rigidly stacked up and a stacked-type optical connector in a stack was butt-connected with its mating stacked-type optical connector, the aforementioned connecting pins could not be inserted in the pin holes or the pin holes were damaged.

SUMMARY OF THE INVENTION

An object of the present invention is to provide a method for stacking ferrules of a stacked-type optical connector whereby easy, high-density stacking of a plurality of ferrules can be achieved.

Another object of the present invention is to provide a stacked-type optical connector which permits smooth butt-connection between stacked-type optical connectors in a stack.

According to the method for stacking ferrules of a stacked-type optical connector of the present invention, a method for simultaneously stacking individual ferrules of a plurality of optical connectors is provided wherein positioning pin holes into which connecting pins are inserted are provided, all ferrules of a plurality of optical connectors are stacked up to simultaneously butt-connect a plurality of optical connectors, which have a ferrule having one or more than one optical fiber, to a plurality of corresponding optical connectors, stacking portions for stacking are provided in positions matching said individual ferrules, said individual ferrules are stacked with said stacking portions aligned, and a plurality of said ferrules are stacked up simultaneously using stacking members which function in cooperation with those corresponding stacking portions so that the ferrules practically float with a specific degree of freedom to allow gaps to be formed between the ferrules.

Further, according to the stacked-type optical connector of the present invention, a stacked-type optical connector is provided, wherein a plurality of optical connectors, which are butt-connected by positioning pin holes and connecting pins fitted into the respective pin holes, which are provided with stacking portions for stacking and which have a ferrule with one or more than one optical fiber, are simultaneously stacked up using stacking components that function in cooperation with said stacking portions in such a way that said ferrules practically float with a specific degree of freedom to allow a gap between the ferrules.

According to the method for stacking ferrules of a stacked-type optical connector of the present invention, a plurality of ferrules can be stacked up easily and compactly with a high density. Further, a stacked-type optical connector assembled using this method can be made smaller, and the time required for simultaneously connecting with other stacked-type optical connectors can be reduced.

Further, a plurality of ferrules are stacked up so that they are allowed to float, therefore, they can move with a specific degree of freedom when butt-connecting the stacked-type optical connectors, and the centers of the connecting pins and pin holes are automatically aligned, permitting smooth connection between the stacked-type optical connectors.

Furthermore, the stacking members used for stacking the ferrules have a simple structure and can be provided at a low cost. Adding the stacking portions to existing ferrules enables easy application of the present invention, permitting easy manufacture of the stacked-type optical connectors.

The aforementioned and other objects, characteristics and advantages of the present inventions will be further clarified by the detailed explanation set forth below with reference to the accompanying drawings.

BRIEF DESCRIPTION OF THE DRAWINGS

FIG. 1 is a front view of a stacked-type optical connector formed by stacking ferrules, illustrating the first embodiment related to the method for stacking the ferrules of a stacked-type optical connector, and a stacked-type optical connector;

FIG. 2 is a plan view of an optical connector before it is stacked up, which constitutes the stacked-type optical connector;

DETAILED DESCRIPTION OF THE PREFERRED EMBODIMENTS

Figure 3:
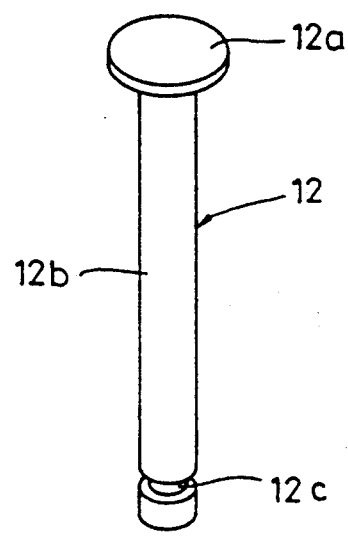
FIG. 3 is a perspective illustration of a stacking pin used for stacking ferrules.

The embodiments related to the method for stacking ferrules of a stacked-type optical connector and a stacked-type optical connector according to the present invention are explained in detail with reference to the drawings.

Embodiment 1

FIG. 1 through FIG. 6 illustrate the first embodiment of the present invention, the stacked-type optical connector being assembled by simultaneously stacking individual ferrules 11 of five optical connectors 10 with stacking pins 12 and 12.

In the optical connector 10, as shown in FIG. 2, a tape fiber 13 comprising a plurality of optical fibers which are covered and formed into a tape-like shape is installed on a main body 11a of a ferrule 11, and a part extending from the rear of the main body 11a is protected by a boot 14. The ends of the individual optical fibers 13a of the tape fiber 13 are exposed on a butting end surface 11b. Further, the main body 11a is stepped and protruded in its front half, and on either side of its width are provided pin holes 11c and 11c for connecting pins. In the rear of the main body 11a, outside the pin holes 11c and 11c, there are stacking holes 11d and 11d which vertically run through, and these stacking holes 11d and 11d constitute the stacking portions.

In the method for stacking the ferrules of a stacked-type optical connector according to the present invention, using the aforementioned optical connector 10, five ferrules 11, for example, are stacked up as described below.

First, the five ferrules 11 are stacked up so that all pairs of the stacking holes 11d and 11d are aligned. Then, from above the stacked ferrules 11, the stacking pins 12 and 12 shown in FIG. 3 are inserted in the individual stacking holes 11d and 11d. The stacking pin 12, as shown in the drawing, has a head 12a secured on the top surface of the main body 11a of the ferrule 11 and a pin shank 12b which is inserted in the stacking hole 11d, and it also has a concave groove 12c which is formed circumferentially near the bottom end of the pin shank 12b and at a height that is slightly greater than the overall thickness of all the five ferrules 11 stacked.

Figure 4:
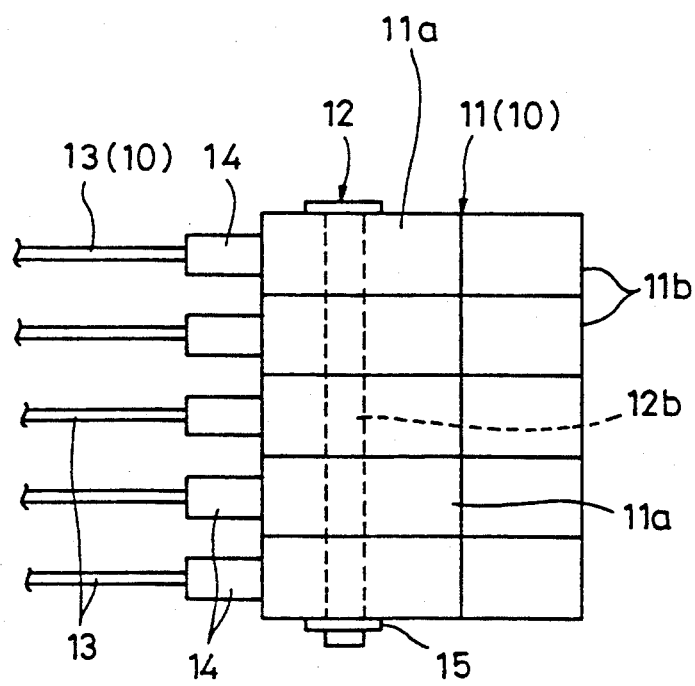
FIG. 4 is a left side view of a stacked-type optical connector formed by stacking ferrules.

Then, a snap ring 15 such as a circular clip is fitted to the concave groove 12c of each stacking pin 12 jutting out downward from the bottom ferrule 11 so that it comes in contact with the bottom surface of the ferrule 11. This assembles the five optical connectors 10 into a stacked-type optical connector with compactly stacked ferrules 11 as shown in FIG. 1 and FIG. 4.

The stacking pin 12 inserted in each stacking hole 11d does not come out of each ferrule 11 even if it is subjected to a force of drawing it out upward because the snap ring 15 is fitted to the concave groove 12c.

To butt-connect the stacked-type optical connector with another stacked-type optical connector, a connecting pin not shown is inserted in a pin hole 11c of the ferrule 11 of one stacked-type optical connector, the butting end surfaces 11b of the individual ferrules 11 are butted, and the connecting pin is inserted in a matching pin hole 11c of the butted ferrule 11 so that it extends over both pin holes 11c and 11c.

In this case, the individual ferrules 11 of the stacked-type optical connectors are stacked up to allow the individual ferrules 11 to practically float in the axial direction of the stacking pins 12 with a specific degree of freedom so that a small gap is allowed between the ferrules 11. Thus, when the connecting pins inserted in the individual pin holes 11c of one ferrule 11 are inserted in the pin holes 11c of the matching ferrule 11, the ferrules 11 slightly float for the aforementioned gap in the axial direction of the stacking pins 12. Therefore, the centers of the matching pin holes 11c with respect to the connecting pins are automatically aligned, ensuring smooth connection between the matching ferrules 11 and 11.

Figure 5:
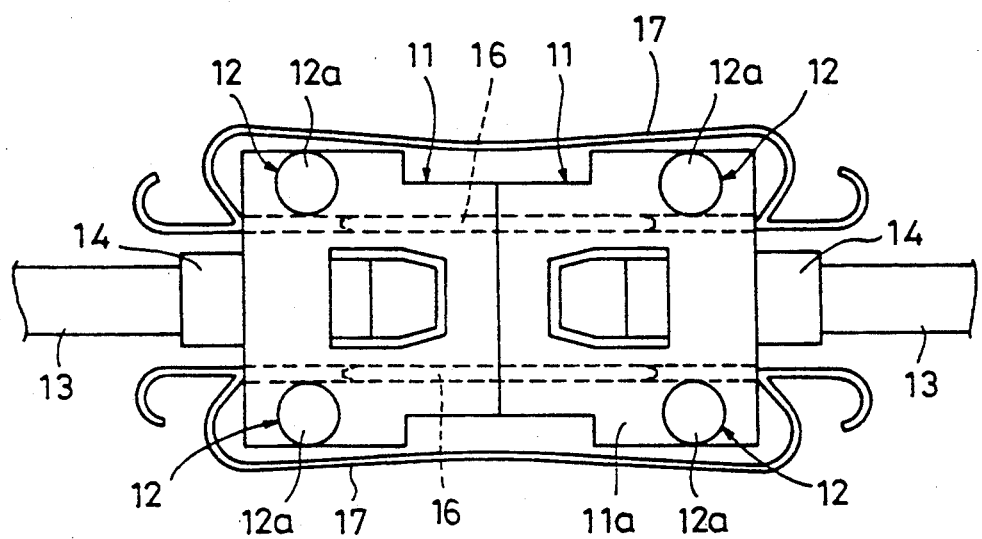
FIG. 5 is a plan view of the stacked-type optical connectors of FIG. 1 which are butt-connected.
Figure 6:
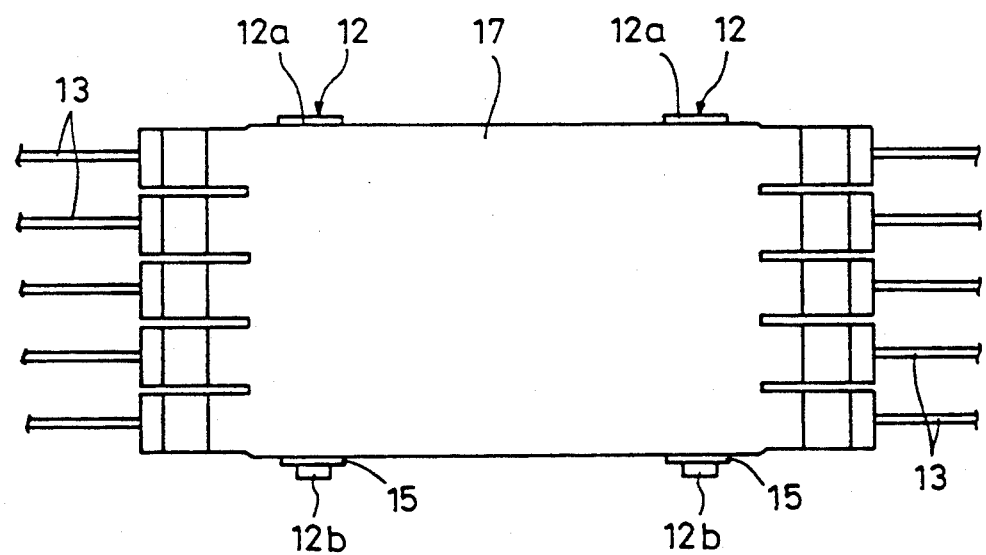
FIG. 6 is a side view of the stacked-type optical connectors of FIG. 5.

In this way, the stacked-type optical connectors with a plurality of ferrules 11 stacked up are butt-connected by inserting connecting pins 16 (See FIG. 5) in the matching pin holes 11c and 11c of the individual ferrules 11 as shown in FIG. 5 and FIG. 6, and to their side surfaces are attached leaf springs 17 and 17 for holding the two stacked-type optical connectors connected.

The butt-connected stacked-type optical connectors can be easily separated into individual stacked-type optical connectors by removing the leaf springs 17 and 17. Further, each stacked-type optical connector can be easily separated into individual optical connectors 10 by removing the snap ring 15 and drawing the stacking pins 12 out of the stacking holes 11d.

When simultaneously stacking up a plurality of ferrules 11 according to the foregoing method, no wasteful space is produced between stacked ferrules 11 of the stacked-type optical connectors, making it possible to compactly stack a plurality of ferrules 11 with a high packaging density. Furthermore, the ferrules 11 permit easy machining of the stacking holes 11d which constitute the stacking portions, and the stacking pins 12 have circular cross-sections, therefore, inexpensive stacked-type optical connectors can be provided.

Embodiment 2

FIG. 7 through FIG. 11 illustrate the second embodiment of the present invention wherein a ferrule 21 of an optical connector 20 is stacked to form a stacked-type optical connector with a U-shaped stacking pin 22.

Figure 7:
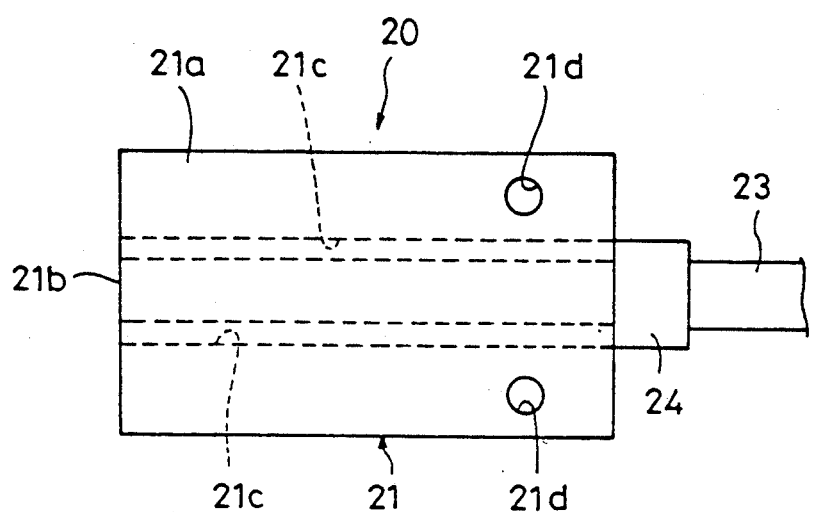
FIG. 7 is a plan view of an optical connector before it is stacked up, illustrating the second embodiment of the present invention.

In the optical connector 20, as shown in FIG. 7, a tape fiber 23 is installed on a main body 21a of a ferrule 21, and a part extending from the rear of the main body 21a is protected by a boot 24. The ends of the individual optical fibers 23a are exposed on a butting end surface 21b. Further, on either side of the width of the main body 21a are provided pin holes 21c and 21c for connecting pins. In the rear of the main body 21a, outside the pin holes 21c and 21c, there are stacking holes 21d and 21d which vertically run through and which constitute the stacking portions.

Figure 8:
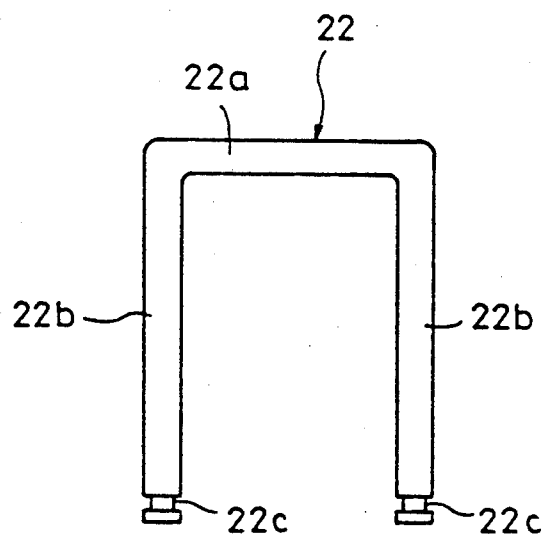
FIG. 8 is a front view of the stacking pin used for stacking the ferrules of the optical connector shown in FIG. 7.

The stacking pin 22 is a U-shaped pin consisting of a bridge 22a with inserting shanks 22b and 22b on either end of the bridge as shown in FIG. 8. Concave grooves 22c are formed circumferentially near the bottom ends of the inserting shanks 22b, at a height which is slightly greater than the overall thickness of all the ferrules 21 stacked.

To stack, for example, five such optical connectors 20, they are first stacked so that the stacking holes 21d and 21d of the ferrules 21 are aligned.

Then, the inserting shanks 22b of the stacking pin 22 are inserted in the matching stacking holes 21d from above the stacked ferrules 21 so that the bridge 22a extends from one stacking hole 21d to the other stacking hole 21d.

Figure 9:
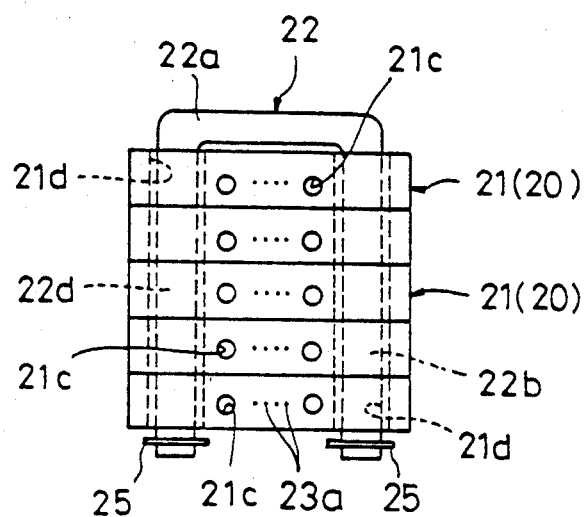
FIG. 9 is a front view of a stacked-type optical connector with ferrules stacked up using the optical connector shown in FIG. 7.
Figure 10:
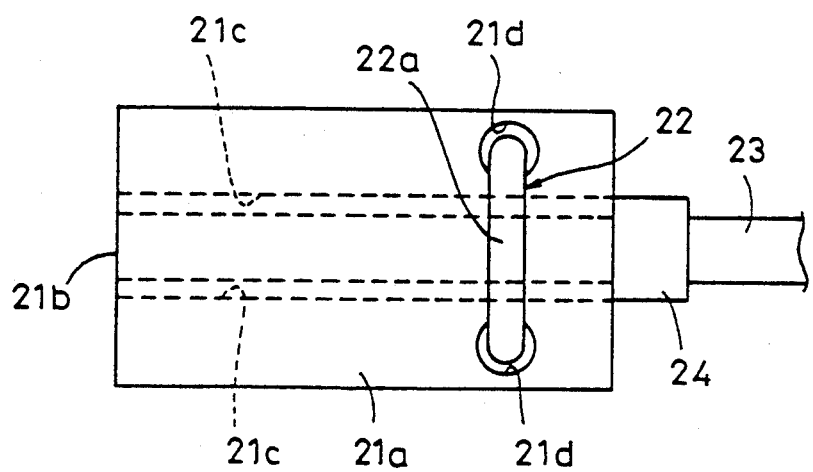
FIG. 10 is a plan view of the stacked-type optical connector shown in FIG. 9.
Figure 11:
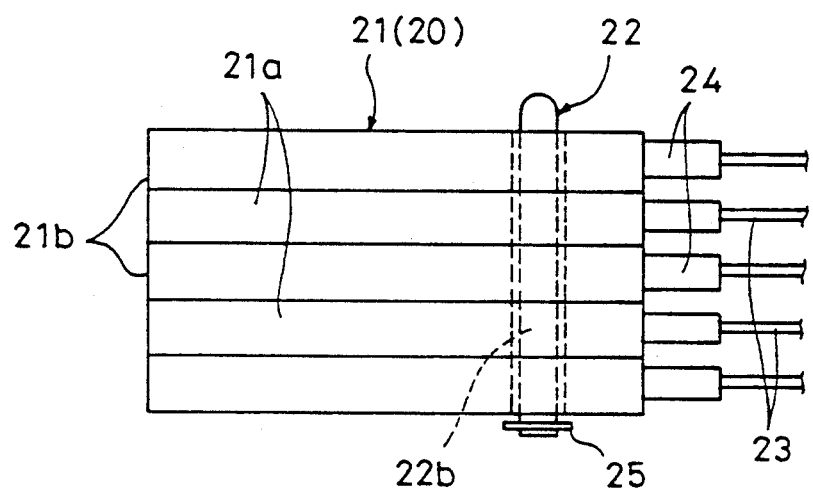
FIG. 11 is a right side view of the stacked-type optical connector shown in FIG. 9.

After that, snap rings 25 are fitted to concave grooves 22c of each stacking pin 22 jutting out downward from the bottom ferrule 21 so that they come in contact with the bottom surface of the ferrule 21. This assembles the five optical connectors 20 into a stacked-type optical connector with compactly stacked up ferrules 21 as shown in FIG. 9 or FIG. 11.

The stacking pin 22 with its inserting shanks 22b inserted in the matching stacking holes 21d does not come off each ferrule 11 even if it is subjected to a force of drawing it out upward because the snap rings 25 are fitted to the concave grooves 22c.

The stacked-type optical connectors with a plurality of ferrules 21 stacked up as described above can be easily butt-connected by inserting a connecting pin (not shown) into the matching pin holes 21c and 21c of each ferrule 21 so that the pin extends over the pin holes as in the first embodiment.

In this case, the individual ferrules 21 of the stacked-type optical connectors are stacked up so that the ferrules practically float with a specific degree of freedom in the axial direction of the inserting shanks 22b of the stacking pins 22 to allow a small gap between the ferrules 21. Thus, when the connecting pins inserted in the individual pin holes 21c of one ferrule 21 are inserted in the pin holes 21c of the other ferrule 21, the ferrules 21 float in the axial direction of each inserting shank 22b. As a result, the centers of the matching pin holes 21c with respect to the connecting pins are automatically aligned, ensuring smooth connection between the matching ferrules 21 and 21.

The butt-connected stacked-type optical connectors can be easily separated into individual stacked-type optical connectors simply by detaching them. Further, each stacked-type optical connector can be easily separated into individual optical connectors 20 by removing the snap rings 25 from the concave grooves 22c and drawing stacking pin 22 out, thereby pulling the inserting shanks 22b and 22b out of the stacking holes 21d and 21d.

According to the present embodiment, a plurality of ferrules 21 can be easily and compactly stacked up to form a stacked-type optical connector, and further, the number of the ferrules 21 to be stacked can be changed by changing the length of the inserting shanks 22b. Further, compared with the foregoing embodiment, the number of the stacking pin 22 is only one, resulting in a fewer components required and also a shorter working time because one insertion allows a stacking pin to be inserted in two stacking holes.

Embodiment 3

The third embodiment of the present invention is now described with reference to FIG. 12 through FIG. 15.

Figure 12:
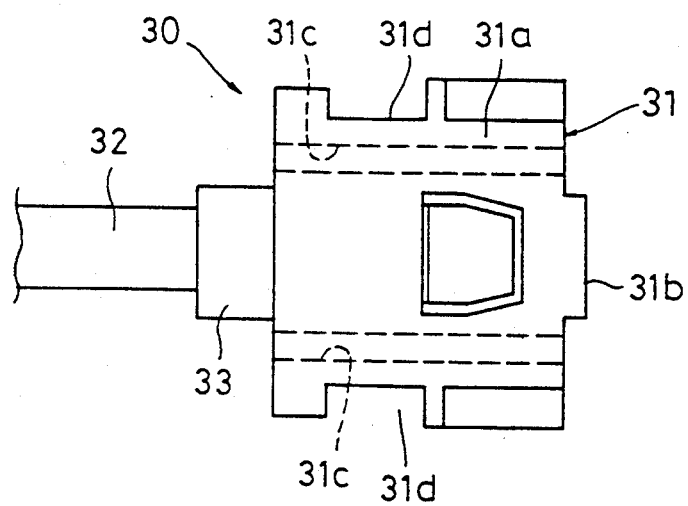
FIG. 12 is a plan view of the optical connector before it is stacked up, illustrating the third embodiment of the present invention.

As shown in FIG. 12, an optical connector 30 has a ferrule 31 and a tape fiber 32 whose end is attached to the ferrule 31, a part of the tape fiber 32 which extends from the rear of the ferrule 31 being protected with a boot 33. Individual optical fibers 32a of the tape fiber 32 are exposed on the butting end surface 31b which projects at the front of a main body 31a of the ferrule 31. On either side of the width of the main body 31a are provided pin holes 31c and 31c in which connecting pins are inserted for butt-connecting the optical connector with another optical connector. Concave stacking grooves 31d and 31d which constitute stacking portions are provided in the sides at the rear.

Figure 13:
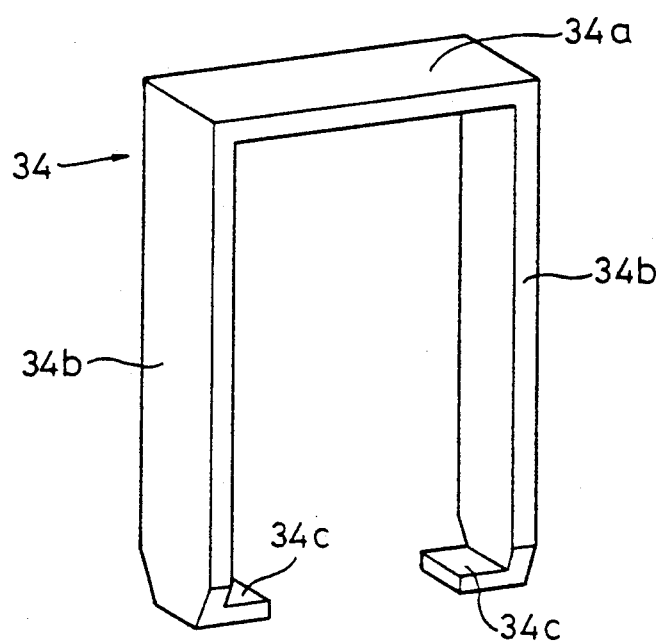
FIG. 13 is a perspective illustration of a coupling clip used for stacking the ferrule of the optical connector shown in FIG. 12.

In this embodiment, the optical connector 30 having the foregoing configuration is stacked up with a coupling clip 34 shown in FIG. 13.

The coupling clip 34 is made of metal or synthetic resin, and it has a bridge 34a arranged over the top surface of the ferrule 31, and holding sections 34b and 34b to be fitted to the stacking grooves 31d and 31d, engaging hooks 34c bent inward being provided at the bottom ends of the holding sections 34b. The coupling clip 34 is designed so that the holding sections 34b between the bridge 34a and the engaging hooks 34c are slightly longer than the overall thickness of the ferrules 31 stacked.

To stack, for example, five ferrules 31, these ferrules 31 are first stacked up so that their stacking grooves 31d are vertically aligned.

Then, the coupling clip 34 is fitted onto the five stacked ferrules 31 from above while spreading the holding sections 34b and 34b.

When the coupling clip 34 is pushed down along the stacking grooves 31d and 31d, the engaging hooks 34c and 34c slide down to the bottom ferrule 31, being guided by the stacking grooves 31d and 31d in the side surfaces of the individual ferrules 31.

When the engaging hooks 34c and 34c reach the bottom surface of the lowest ferrule 31, the clamping force of the holding sections 34b and 34b causes the hooks to be secured onto the bottom surface of the lowest ferrule 31 and also causes the individual holding sections 34b to be fitted to the individual stacking grooves 31d of the five ferrules.

Figure 14:
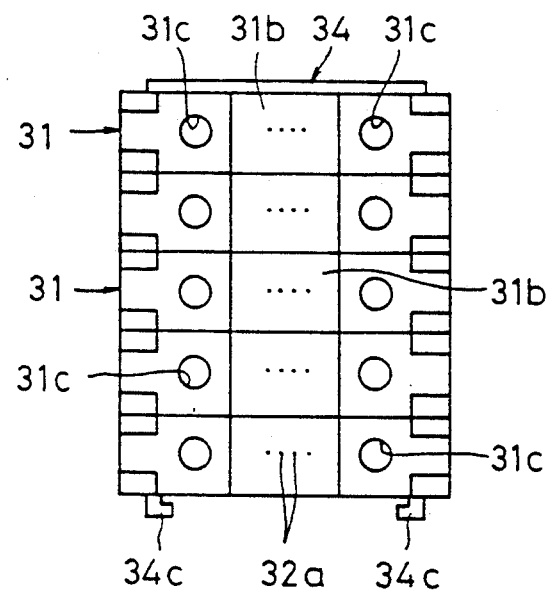
FIG. 14 is a front view of the stacked-type optical connector wherein a plurality of the ferrules of the optical connector shown in FIG. 12 are stacked up with the coupling clip.
Figure 15:
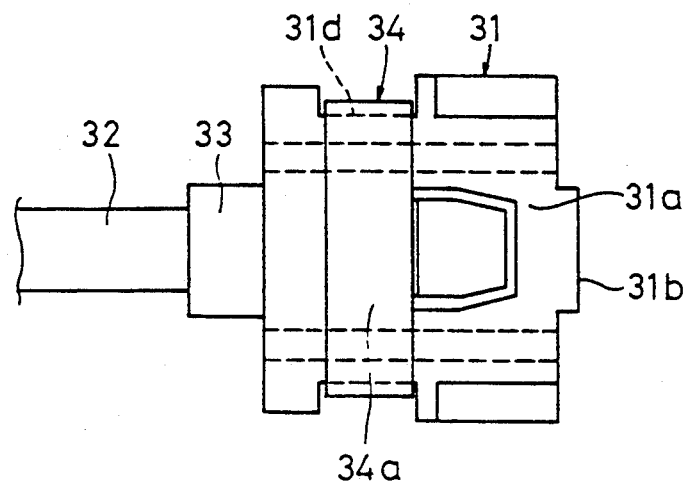
FIG. 15 is a plan view of the stacked-type optical connector shown in FIG. 14.

Thus, a stacked-type optical connector with the five ferrules 31 stacked together is formed as shown in FIG. 14 and FIG. 15.

The coupling clip 34 does not come off the stacked-type optical connector even if it is subjected to an upward pulling force since the clamping force of the holding sections 34b keeps the engaging hooks 34c secured to the bottom surface of the lowest ferrule 31.

To butt-connect the stacked-type optical connector with another stacked-type optical connector, connecting pins not shown are inserted in the pin holes 31c of each ferrule 31 of one stacked-type optical connector, the butting end surfaces 31b of the individual ferrules 31 are butted, and the connecting pins are inserted in corresponding pin holes 31c of the individual butted ferrules 31, thus extending over both pin holes 31c and 31c.

In this case, the length of the holding sections 34b between the bridge 34a and the engaging hooks 34c of the coupling clip 34 is made slightly greater than the overall thickness of the ferrules 31 stacked. Therefore, the individual ferrules 31 of the stacked-type optical connectors are stacked up so that they practically float along the length of the holding sections 34b with a specific degree of freedom to allow a gap between the ferrules 31. Thus, when the connecting pins inserted in the individual pin holes 31c of one ferrule 31 are inserted in the pin holes 31c of the mating ferrule 31, the ferrules 31 float along the length of the holding sections. As a result, the centers of the matching pin holes 31c with respect to the connecting pins are automatically aligned, ensuring smooth connection between the matching ferrules 31 and 31.

In this way, the stacked-type optical connectors with a plurality of ferrules 31 stacked up are butt-connected by inserting connecting pins in the matching pin holes 31c and 31c of the individual ferrules 31, and a leaf spring (not shown) is attached to their sides for keeping them butt-connected as in the first embodiment.

The butt-connected stacked-type optical connectors can be easily separated into individual stacked-type optical connectors by removing said leaf spring and pulling them apart laterally.

Further, each stacked-type optical connector can be easily separated into individual optical connectors 30 by spreading the holding sections 34b and 34b and drawing the coupling clip 34 upward.

Embodiment 4

FIG. 16 through FIG. 19 illustrate the fourth embodiment of the method according to the present invention, wherein a plurality of optical connectors 40 are stacked into one piece with an elastic cap 50.

Figure 17:
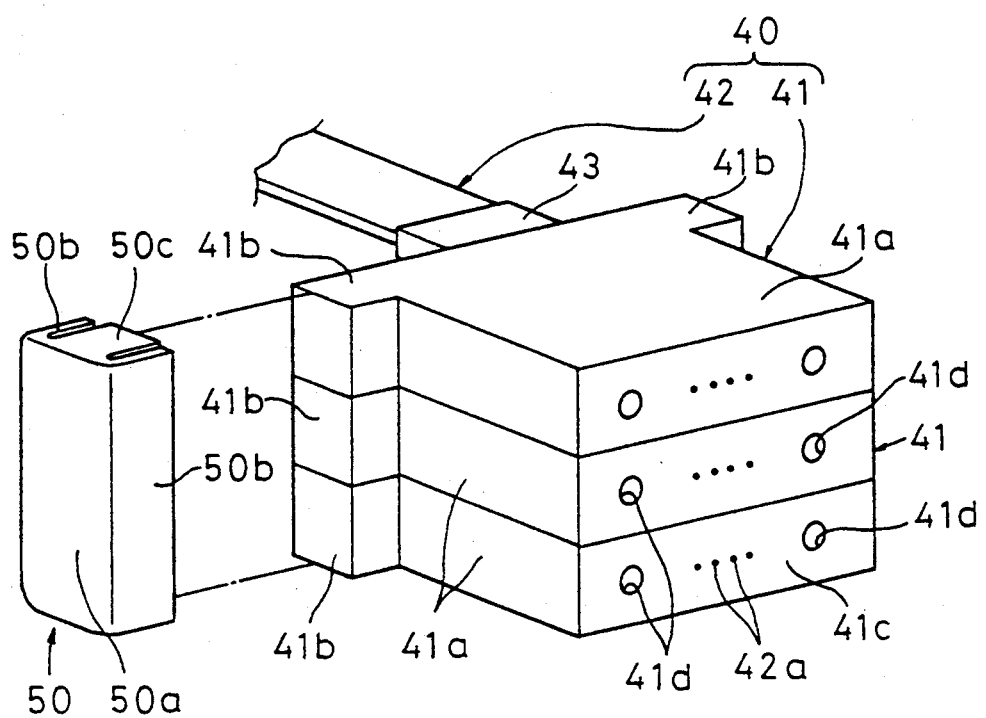
FIG. 17 is a perspective view of the elastic cap to be fitted a plurality of pinching portions of the stacked ferrules.

In this case, the optical connector 40 has a ferrule 41, a tape fiber 42, and a boot 43 which protects a part extending from the rear of the ferrule 41 as shown in FIG. 17.

The ferrule 41 has pinching portions 41b and 41b which protrude widthwise at the rear of a main body 41a, constituting the stacking portions. Optical fibers 42a of the tape fiber 42 are exposed on a front butting end surface 41c. Pin holes 41d and 41d which run through longitudinally are provided in either side of the main body 41a.

Figure 16:
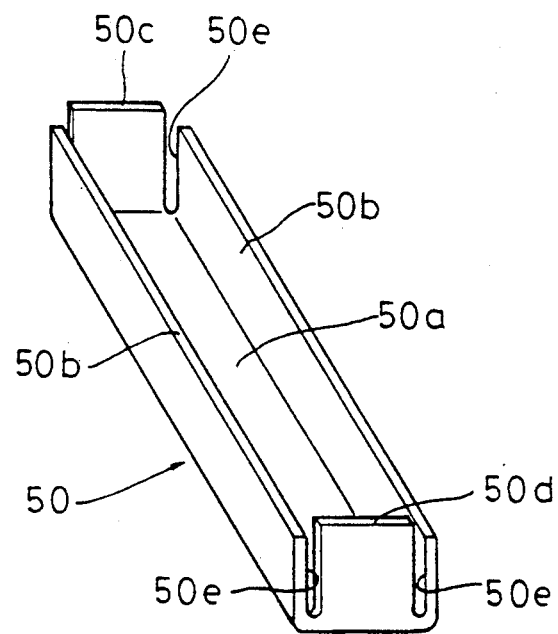
FIG. 16 is a perspective view of an elastic cap used for stacking the ferrules of a plurality of optical connectors, illustrating the fourth embodiment of the present invention.

An elastic cap 50 is a component which wraps and holds all pinching portions 41b of a plurality of stacked ferrules 41, and its height and longitudinal width are slightly greater than the all pinching portions 41b together of the stacked ferrules 41. The elastic cap 50 has, as shown in FIG. 16, a base wall 50a, side walls 50b and 50b standing on the side edges of the base wall 50a, a top wall 50c, and a bottom wall 50d. The elastic cap 50 further has slits 50e which separate the side walls 50b and 50b from the top and bottom walls 50c and 50d, each of the walls 50b through 50d being provided with elasticity.

There is no limitation on the material of the elastic cap 50 in particular as long as the stacked ferrules 41 are elastically held together. For instance, a metal such as aluminum or a synthetic resin such as polyethylene may be used.

In this embodiment, the ferrules 41 of a plurality of optical connectors 40 are stacked up using the elastic cap 50 as described below.

First, the desired number, e.g., three, of optical connectors 40 are stacked up by the pinching portions 41b which constitute the stacking portions to stack the ferrules 41.

Then, as shown in FIG. 17, the elastic cap 50 is fitted onto the three pinching portions 41b on one side of the stacked ferrules 41. In the same manner, the elastic cap 50 is fitted onto the three pinching portions 41b on the other side to form a stacked-type optical connector shown in FIG. 19. Accordingly, in this stacked-type optical connector, a small gap is allowed between the ferrules 41 so that the ferrules can move slightly and also practically float in the longitudinal direction, i.e., the butting direction, and in the vertical direction with a specific degree of freedom.

Figure 18:
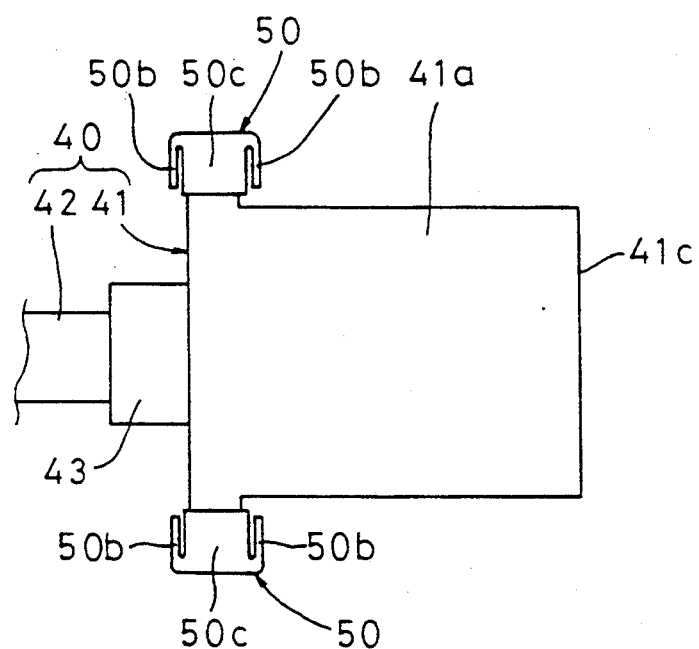
FIG. 18 is a plan view of the stacked-type optical connector with the elastic cap fitted to the pinching portions of the stacked ferrules.
Figure 19:
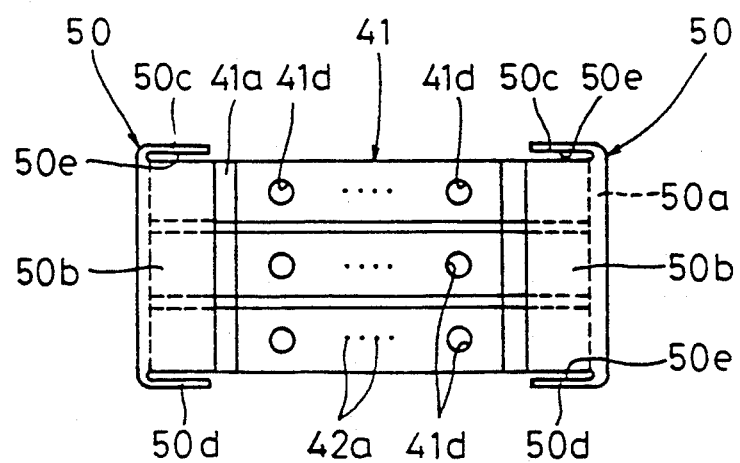
FIG. 19 is a front view of FIG. 18.

In this case, the elastic cap 50 has a slightly greater height and longitudinal width than the size of all pinching portions 41b together of the stacked ferrules 41, and each of the walls 50b through 50d is given elasticity by the slits 50e. Therefore, the walls 50b through 50d elastically deform to slightly expand, allowing the elastic cap 50 to be easily fitted onto all the pinching portions 41b as shown in FIG. 18 and FIG. 19.

Thus, by using the elastic cap 50, the three optical connectors 40 can be formed into a stacked-type optical connector wherein a plurality of ferrules 41 are compactly and easily stacked up without taking any extra space. In addition, the elastic cap 50 can be provided at a low cost because of its simple structure.

In the case of the stacked-type optical connector, the elastic cap 50 can be easily removed from a plurality of the pinching portions 41b simply by pulling the elastic cap 50 sideways, thus separating the stacked ferrules 41 into individual pieces.

The stacked-type optical connector with a plurality of ferrules 41 stacked is butt-connected with another stacked-type optical connector by inserting connecting pins not shown into the corresponding pin holes 41d and 41d of the mating ferrules 41 and 41 in such a manner that the pins extend over the pin holes.

When butt-connecting the stacked-type optical connectors, the pinching portions 41b of a plurality of the ferrules 41 are held together by the elastic cap 50, and the individual ferrules 41 are stacked so that they practically float in the longitudinal direction, i.e., the butting direction, and in the vertical direction with a specific degree of freedom. Therefore, the individual ferrules 41 slightly float when butt-connecting the stacked-type optical connectors, and when the connecting pins inserted into the individual pin holes 41c of one ferrule 41 are inserted in the pin holes 41c of the mating ferrule 41, the centers of the matching pin holes 41c are automatically aligned, ensuring smooth connection between the matching ferrules 41 and 41.

Embodiment 5

The fifth embodiment of the present invention is now described in detail, referring to FIG. 20 through FIG. 28.

Figure 20:
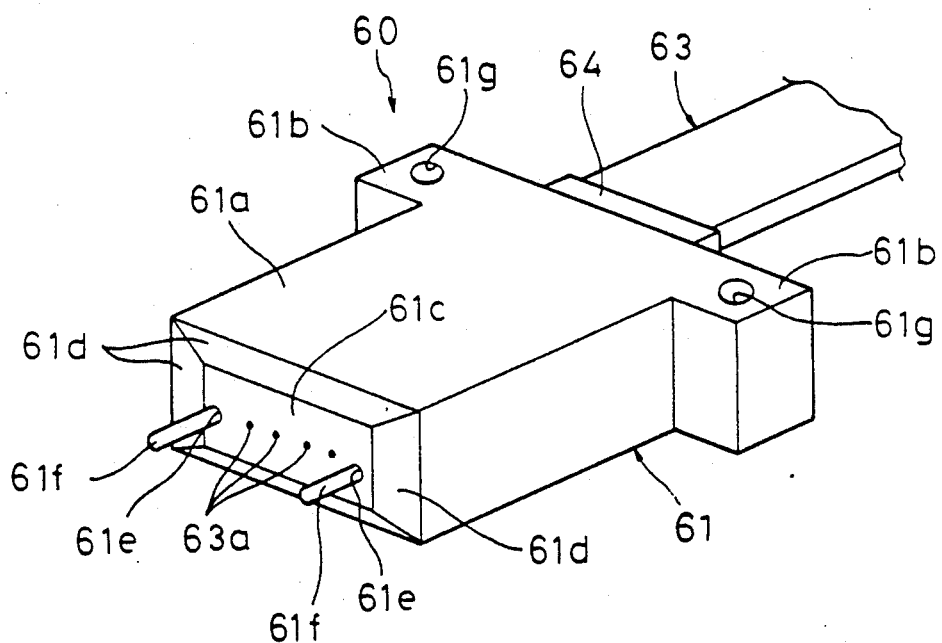
FIG. 20 is a perspective view of an optical connector showing a stacked-type optical connector, illustrating the fifth embodiment of the present invention.
Figure 21:
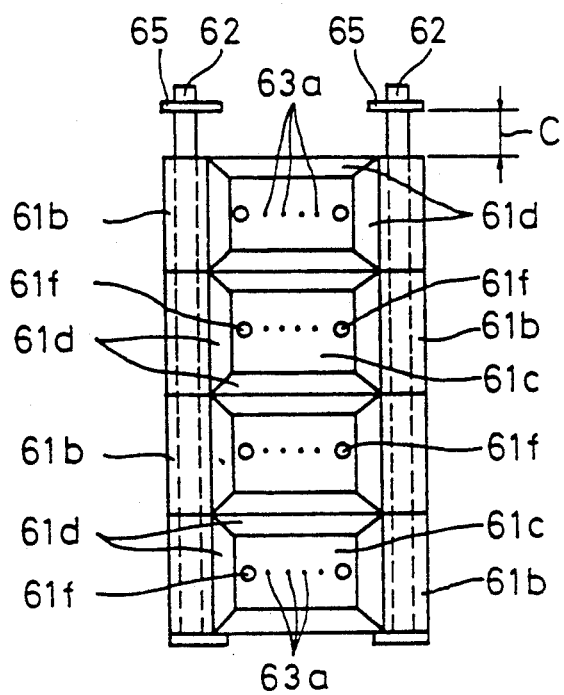
FIG. 21 is a front view of a stacked-type optical connector assembled by stacking the optical connector shown in FIG. 20.
Figure 22:
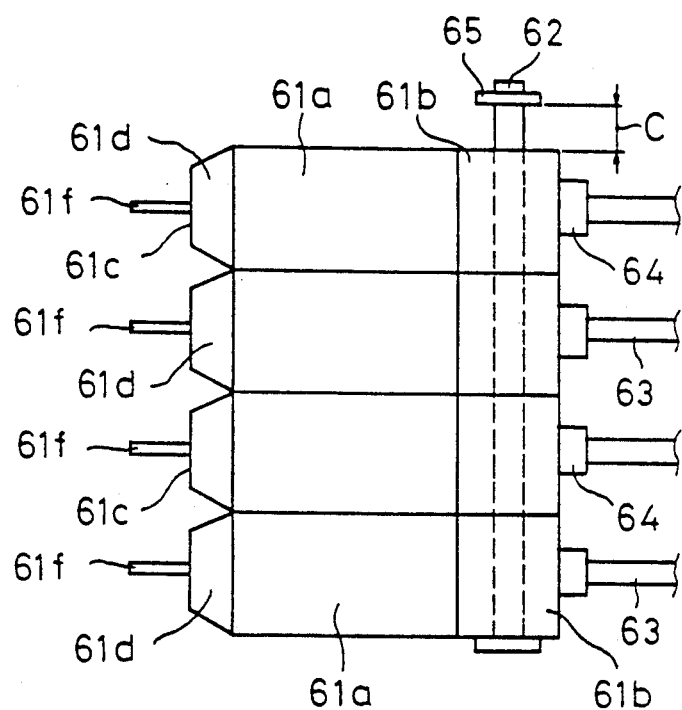
FIG. 22 is a right side view of the stacked-type optical connector shown in FIG. 21.

A stacked-type optical connector 60 consists of a plurality of optical connectors 61 shown in FIG. 20 which are stacked with stacking pins 62 so that they can float in the axial direction of the pins with a specific degree of freedom to allow a gap between the individual ferrules as shown in FIG. 21 and FIG. 22.

As shown in FIG. 20, the optical connector 61 has a ferrule main body 61a with individual optical fibers 63a of a tape fiber 63 exposed at the front, and pinching portions 61b and 61b which project widthwise at the rear of the main body 61a. A part of the tape fiber 63, which extends from the main body 61a, is protected with a boot 64.

The main body 61a has a tapered surface 61d around a front butting end surface 61c, and pin holes 61e and 61e formed lengthwise in either side of the width of the main body 61a. Connecting pins 61f and 61f for positioning when connecting with another stacked-type optical connector are inserted in the individual pin holes 61e in such a manner that they jut out from the butting end surface 61c and are free to move vertically.

The connecting pins 61f are made slightly longer than the pin holes 61e so that their ends on one side protrude from the pin holes 61e by a specific length when they are inserted in the pin holes 61e. Further, the ends of the connecting pins 61f and of the pin holes 61e are tapered for easy insertion of the connecting pins 61f. The individual pinching portions 61b have stacking holes 61g and 61g which run through vertically, and these stacking holes 61g and 61g constitute the stacking portions.

As shown in FIG. 21 and FIG. 22, the stacked-type optical connector 60 is assembled by stacking four optical connectors 61 with the stacking holes 61g in the pinching portions 61b aligned and inserting the stacking pins 62 in the vertically aligned stacking holes 61g, then installing snap rings 65 near the top ends.

In this case, the length of the stacking pins 62 of the stacked-type optical connector 60 is set slightly greater than the height of the optical connectors 61 stacked up so that, when the stacked-type optical connector is assembled, the individual optical connectors 61 can practically float and move with a specific degree of freedom in the axial direction of the stacking pins 62 by a gap C formed between the top optical connector 61 and the snap rings 65 as shown in FIG. 21 and FIG. 22. The floating amount which allows the individual optical connectors 61 to move in the axial direction of the stacking pins 62 and which is given by the gap C formed between the top optical connector 61 and the snap rings 65 is set smaller than the chamfering amount of the tapered surfaces 61d in the optical connector 61 and the chamfering amount of the ends of the connecting pins 61f or the pin holes 61e.

Figure 23:
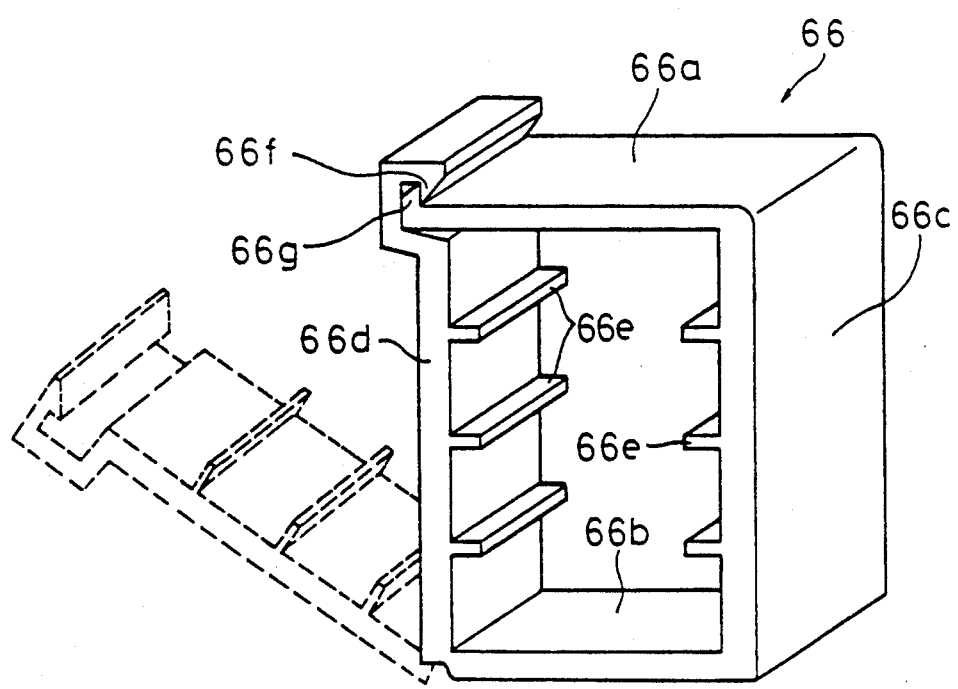
FIG. 23 is a perspective view of an adapter used for butt-connecting the stacked-type optical connector shown in FIG. 21 with another one.

The stacked-type optical connector 60 thus assembled is butt-connected to another stacked-type optical connector via an adapter 66 shown in FIG. 23.

The adapter 66 has top and bottom pieces 66a and 66b, a side piece 66c, a flap 66d hinged with the bottom piece 66b, and a plurality of partitioning pieces 66e protruding from the side piece 66c and the flap 66d, the adapter being molded into one piece using a synthetic resin or the like. The adapter 66 is shaped like a rectangular tube by hooking a hook 66f provided on the top end of the flap 66d onto a engaging projection 66g formed on the end of the top piece 66a. When the stacked-type optical connector 60 is attached to the adapter, the individual optical connectors 61 vertically move with its tapered surfaces 61d being guided by the partitioning pieces 66e, and they are separately housed in the respective spaces formed by the side piece 66c, the flap 66d, and the individual partitioning pieces 66e.

In this case, the gap C formed between the top optical connector 61 and the snap ring 65 specifies the floating amount for the optical connector 61 to move in the axial direction of the stacking pin 62. However, the actual floating amount allowed for each optical connector 61 is a value obtained by subtracting the total thickness of the three partitioning pieces 66e of the adapter 66 from the gap C and then equally dividing the resulting value.

A stacked-type optical connector 60 using the adapter 66 thus configured is butt-connected to another stacked-type optical connector 60 according to the following procedure.

Figure 24:
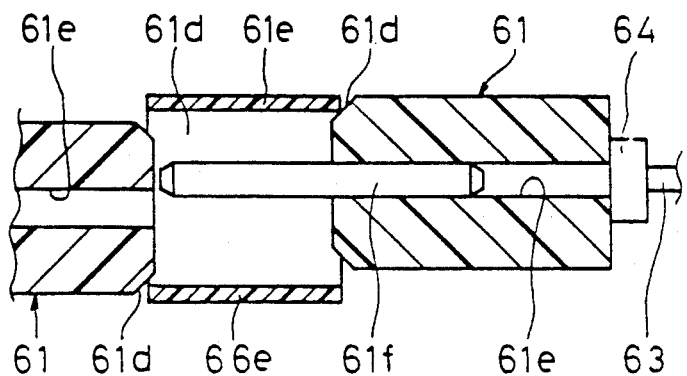
FIG. 24 is a cross-sectional view showing an enlarged view of a major section of the optical connector and the adapter in an initial phase of the butt-connection between the stacked-type optical connectors shown in FIG. 21.

First, the stacked-type optical connector 60 with connecting pins 61f inserted in the respective pin holes 61e is placed facing the other stacked-type optical connector 60 with no pins inserted, and the tapered surfaces 61d of the individual optical connectors 61 are applied to the partitioning pieces 66e of the adapter 66 as shown in FIG. 24.

Figure 25:
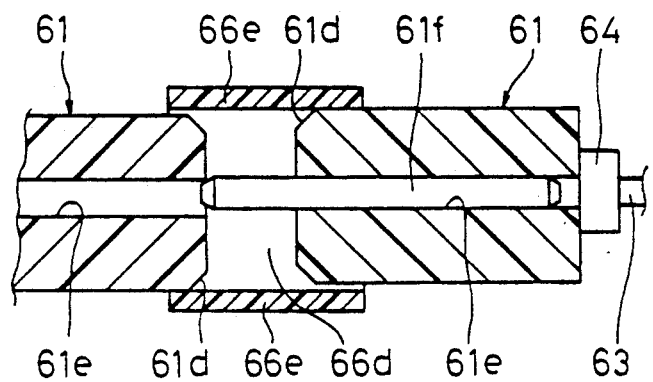
FIG. 25 is a cross-sectional view showing an enlarged view of a major section of the front section of the optical connector fitted to the adapter in the butt-connection of the stacked-type optical connectors.

Then, when the individual stacked-type optical connectors 60 are pushed into the adapter 66, the tapered surfaces 61d are guided by the individual partitioning pieces 66e of the adapter 66, the individual optical connectors 61 vertically float, and as shown in FIG. 25, the front side of each of the optical connectors 61 is fitted into a specific space enclosed by the side piece 66c, the flap 66d and each partitioning piece 66e of the adapter 66. At the same time, the individual connecting pins 61f retreat while they are in contact with the pin holes 61e of the matching optical connector 61, thus moving in the respective pin holes 61e of the matching optical connector 61 to the right in the drawing.

Figure 26:
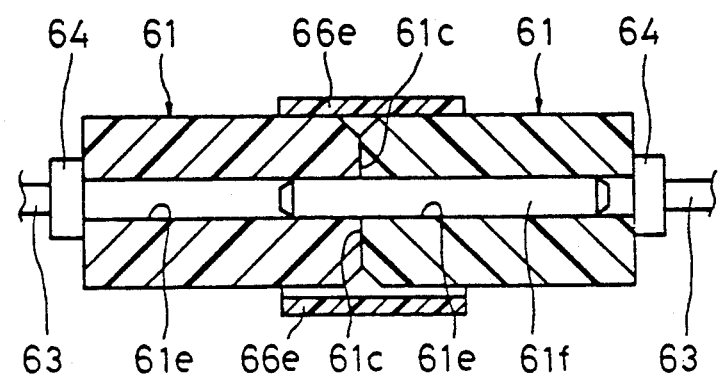
FIG. 26 is a cross-sectional view showing an enlarged view of a major section of the butted optical connectors in the butt-connection of the stacked-type optical connectors.

When both stacked-type optical connectors 60 are further pushed into the adapter 66, the individual connecting pins 61f of one optical connector 61 are inserted in the individual pin holes 61e of the other optical connector 61 while they are guided by the tapered ends, thereby butting the butting end surfaces 61c and 61c of the two optical connectors 61 and 61 as shown in FIG. 26. Thus, the individual optical connectors 61 of the stacked-type optical connectors 60 and 60 are butt-connected with the adapter 66.

At this time, the individual optical connectors 61 float in the axial direction of the stacking pins 62 and 62 to permit good positioning for butt-connection. Since the floating amount is set smaller than the chamfering amount of the tapered surface 61d and of the end of each connecting pin 61f, each of the optical connectors is fitted into the specific space enclosed by the side piece 66c, the flap 66d and each 66e of the adapter 66. In addition, the individual connecting pins 61f of the mating optical connector 61 are made slightly longer than the pin holes 61e, and therefore, their ends are inserted in the pin holes 61e of the matching optical connector 61. In this way, the tape fibers 63 of the individual optical connectors 61 are properly butt-connected so that the individual optical fibers 63a exposed on the butting end surfaces 61c incur no connecting loss.

Figure 27:
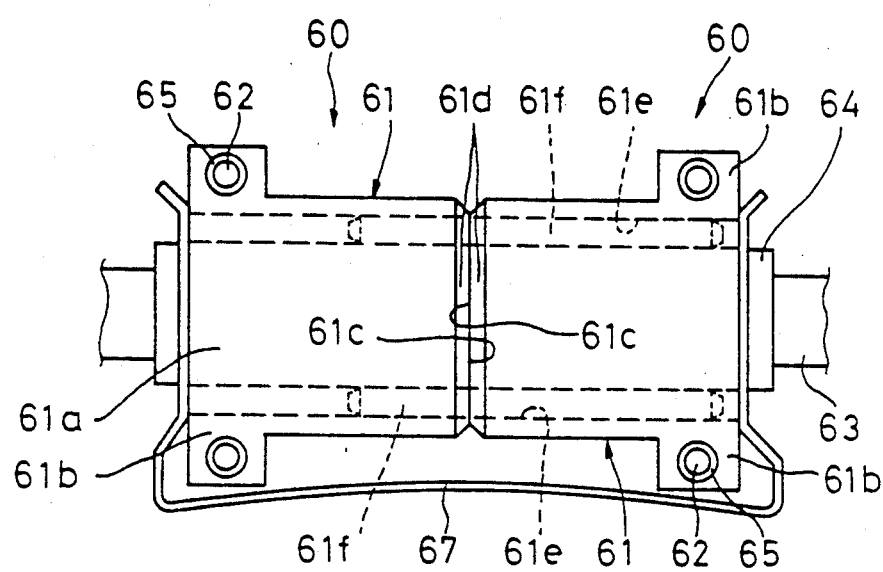
FIG. 27 is a plan view of both stacked-type optical connectors with a clip on to keep them connected after the adapter is removed from the two butted stacked-type optical connectors.

The adapter 66 is removed from the properly butt-connected stacked-type optical connectors 60 and 60 by releasing the engagement between the hook 66f and the engaging projection 66g, pulling the flap 66d down, and drawing out the individual partitioning pieces 66e installed between the optical connectors 61 and 61. After that, a clip 67 is fitted from a side onto the two connected stacked-type optical connectors 60 and 60 as shown in FIG. 27 to hold them connected.

In the case of the stacked-type optical connectors 60 thus butt-connected, if a failure or the like occurs, only an affected optical connector 61 can be isolated by removing the clip 67 and drawing out the stacking pins 62 and 62 to separate the optical connectors into single optical connectors 61. This makes it possible to perform maintenance work such as repair with all optical fibers 63a in other optical connectors 61 alive. Further, it is also possible to branch the optical line, taking out only the desired optical connector 61 while keeping the line alive.

Figure 28:
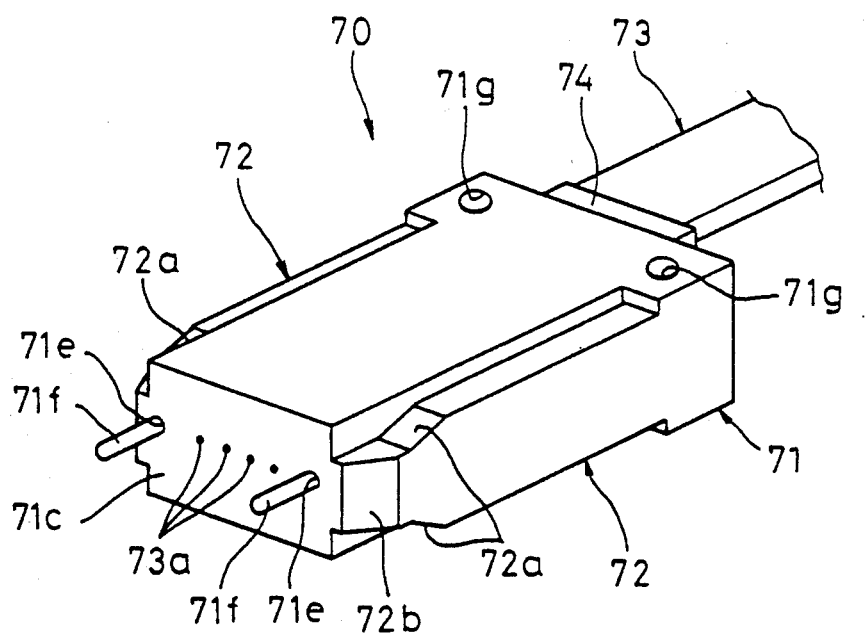
FIG. 28 is a perspective view showing another optical connector which constitutes a stacked-type optical connector.
Figure 29:
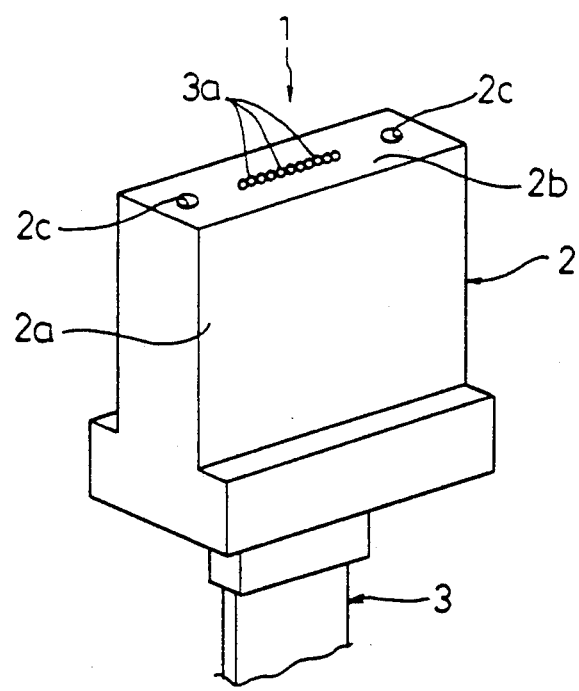
FIG. 29 is a perspective view of an optical connector used for a method for stacking ferrules of a conventional stacked-type optical connector.

Each of the optical connectors of the above-described stacked-type optical connector 60 may be provided with a guide 72 which extends lengthwise along either side of a ferrule 71 as in an optical connector 70 shown in FIG. 28, the guide 72 being provided, as shown in the drawing, with tapered surfaces 72a and 72a which serve as vertical guides and a tapered surface 72b which serves as a widthwise guide for butt-connecting the connectors via the adapter 66. In FIG. 28, the same components as those of the optical connector 61 of the foregoing stacked-type optical connector 60 are given the corresponding numbers, the detailed description being omitted.

In the embodiments described above, when the ferrules are stacked up with the stacking pins, the snap rings are fitted near the ends of the stacking pins to prevent the pins from slipping off the ferrules. It is needless to say that the means for preventing the stacking pins from slipping off the ferrules is not limited to the snap rings as long as it serves the purpose, and a cotter pin, for instance, may be used as the retainer.

Further, in the embodiment wherein an adapter is used to stack the ferrules, the optical connectors are provided with tapered surfaces. It is needless to say that the adapter may be provided with tapered surfaces which serve as guides at the time of butt-connection.

Furthermore, in all the embodiments discussed above, the description is given of optical connectors which have multi optical fibers, but it is needless to say that the optical connectors may have only single optical fibers.

What is claimed is:

1. A method for stacking ferrules of a stacked-type optical connector wherein individual ferrules of a plurality of optical connectors are all stacked up to simultaneously butt-connect a plurality of optical connectors, which optical connectors are provided with positioning pin holes in which connecting pins are inserted and which have a ferrules with at least one optical fiber, to a plurality of other matching optical connectors, and wherein stacking portions for stacking are provided in each ferrule at matching positions on said individual ferrules, the method comprising:
stacking said individual ferrules with said individual stacking portions of each of said stacked ferrules aligned; and
engaging at least one stacking member with said aligned stacking portions of each of said stacked ferrules such that said ferrules are all stacked up using said at least one stacking member working in cooperation with corresponding stacking portions of said stacked ferrules so that said stacked and engaged ferrules each are movable relative to each other and can practically float with a specific degree of freedom, and thereby allowing a gap to be formed between the respective ferrules during butt-connecting of said stacked ferrules.

2. The method for stacking ferrules of a stacked-type optical connector according to claim 1, wherein said stacking portions comprise stacking holes formed in each of said ferrules.

3. The method for stacking ferrules of a stacked-type optical connector according to claim 2, wherein said at least one stacking member comprises:
a plurality of stacking pins which are inserted in respective corresponding aligned stacking holes of the stacked ferrules; and
retaining means coupled to said stacking pins for retaining said stacking pins inserted in said stacking holes.

4. The method for stacking ferrules of a stacked-type optical connector according to claim 3, wherein said retaining means comprises a concave groove formed in each of said stacking pins, and a snap ring fitted onto the concave groove of each stacking pin.

5. The method for stacking ferrules of a stacked-type optical connector according to claim 2, wherein said stacking member comprises a single stacking pin which is spread over and inserted in said aligned stacking holes of said stacked ferrules, and which is provided with a retaining means for retaining said stacking pins in said stacking holes.

6. The method for stacking ferrules of a stacked-type optical connector according to claim 5, wherein said retaining means comprises concave grooves formed in said stacking pin and snap rings fitted to the respective concave grooves.

7. The method for stacking ferrules of a stacked-type optical connector according to claim 1, wherein said stacking portions comprise stacking grooves provided in said ferrule.

8. The method for stacking ferrules of a stacked-type optical connector according to claim 7, wherein said stacking member comprises a coupling clip which has holding portions to be fitted to said aligned stacking grooves of said stacked ferrules, and engaging hooks.

9. The method for stacking ferrules of a stacked-type optical connector according to claim 1, wherein said stacking portion comprises pinching portions provided on said ferrule.

10. The method for stacking ferrules of a stacked-type optical connector according to claim 9, wherein said stacking member comprises an elastic cap means for wrapping and holding all said pinching portions which are aligned and stacked.

11. The method for stacking ferrules of a stacked-type optical connector according to claim 10, wherein said cap means is provided with slits for producing elasticity in said cap means.

12. A stacked-type optical connector wherein optical connectors, each including a ferrule, are stacked up, comprising:

a plurality of said optical connectors which are adapted to be butt-connected by means of positioning pin holes and connecting pins fitted in the respective pin holes, each optical connector having respective stacking portions for use in said stacking and which are aligned when said optical connectors are stacked;

each optical connector having a ferrule with at least one optical fiber; and stacking means engageable with said aligned stacking portions such that a plurality of said ferrules are engaged in a stacked manner with said stacking means and are movable relative to each other and are allowed to practically float with a specific degree of freedom, to thereby allow a gap to form between the respective ferrules during butt-connecting of said stacked ferrules.

13. The stacked-type optical connector according to claim 12, wherein said stacking means comprises stacking holes provided in said ferrules.

14. The stacked-type optical connector according to claim 13, wherein said stacking means comprises a plurality of stacking pins which are inserted in said corresponding aligned stacking holes of said stacked ferrules and which are provided with a retaining means for retaining said stacking pins engaged in said stacking holes.

15. The stacked-type optical connector according to claim 14, wherein said retaining means comprises a respective concave groove formed in each said stacking pin and a snap ring fitted to the respective concave groove.

16. The stacked-type optical connector according to claim 13, wherein said stacking means comprises a single stacking pin which is extended over and inserted in said corresponding aligned stacking holes and which is provided with a retaining means for retaining said stacking pin in said aligned stacking holes.

17. The stacked-type optical connector according to claim 16, wherein said retaining means comprises concave grooves formed in said stacking pin, and snap rings fitted to the respective concave grooves.

18. The stacked-type optical connector according to claim 12, wherein said stacking means comprises stacking grooves formed in said ferrule.

19. The stacked-type optical connector according to claim 18, wherein said stacking means comprises a coupling clip which has holding portions fitted to said corresponding aligned stacking grooves and engaging hooks.

20. The stacked-type optical connector according to claim 12, wherein said stacking means comprises pinching portions provided on said ferrule.

21. The stacked-type optical connector according to claim 20, wherein said stacking means comprises an elastic cap means for wrapping and holding all of said corresponding aligned pinching portions of said stacked ferrules.

22. The stacked-type optical connector according to claim 21, wherein said cap means is provided with slits which produce elasticity in said cap means.

23. The stacked-type optical connector according to claim 12, wherein said stacked-type optical connector is butt-connected to another stacked-type optical connector via an adapter.

24. The stacked-type optical connector according to claim 23, wherein the individual ferrules of said stacked-type optical connector are provided with guides for butt-connecting to another stacked-type optical connector via said adapter.

* * * * *